(12) United States Patent
Wade et al.

(10) Patent No.: US 9,697,085 B2
(45) Date of Patent: *Jul. 4, 2017

(54) PRESENTING A FILE SYSTEM FOR A FILE CONTAINING ITEMS

(71) Applicant: Quantum Corporation, San Jose, CA (US)

(72) Inventors: Gregory Wade, San Jose, CA (US); J. Mitchell Haile, Somerville, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,886

(22) Filed: Sep. 28, 2015

(65) Prior Publication Data

US 2016/0019118 A1 Jan. 21, 2016

Related U.S. Application Data

(63) Continuation of application No. 13/925,455, filed on Jun. 24, 2013, now Pat. No. 9,146,813, which is a continuation of application No. 12/874,752, filed on Sep. 2, 2010, now Pat. No. 8,473,531, which is a continuation-in-part of application No. 12/849,006, filed on Aug. 2, 2010.

(60) Provisional application No. 61/239,674, filed on Sep. 3, 2009.

(51) Int. Cl.
*G06F 17/30* (2006.01)
*G06F 11/14* (2006.01)

(52) U.S. Cl.
CPC .... *G06F 11/1435* (2013.01); *G06F 17/30067* (2013.01); *G06F 17/30126* (2013.01); *G06F 17/30221* (2013.01)

(58) Field of Classification Search
CPC ......... G06F 17/30221; G06F 17/30067; G06F 17/30126; G06F 11/1435
USPC ................ 707/644–654, 823, 827, 828, 831; 709/203, 217, 218, 219
See application file for complete search history.

(56) References Cited

U.S. PATENT DOCUMENTS

| | | | |
|---|---|---|---|
| 6,047,294 A * | 4/2000 | Deshayes et al. | |
| 6,397,308 B1 * | 5/2002 | Ofek et al. | 711/162 |
| 6,681,238 B1 | 1/2004 | Brice | |
| 7,103,737 B1 | 9/2006 | Kekre et al. | |
| 7,370,025 B1 | 5/2008 | Pandit | |
| 7,669,020 B1 | 2/2010 | Shah | |
| 8,171,201 B1 | 5/2012 | Edwards | |
| 8,352,608 B1 | 1/2013 | Keagy | |
| 8,463,825 B1 | 6/2013 | Harty | |

(Continued)

OTHER PUBLICATIONS

Laurent Castanie et al., Distributed Shared Memory for Roaming Large Volumes, 2006, IEEE, vol. 12, 1299-1306.*

*Primary Examiner* — Jean B Fleurantin

(57) ABSTRACT

What is disclosed is a method of operating a volume access system. The method includes processing at least a first file to generate a file system view of the first file comprising a plurality of items within the first file, and providing the file system view of the first file over a network interface as a hierarchical data volume. The method also includes receiving an access request for a requested item of the hierarchical data volume over the network interface, and in response, providing access to a first item of the plurality of items within the first file corresponding to the requested item.

6 Claims, 5 Drawing Sheets

(56) References Cited

U.S. PATENT DOCUMENTS

| | | |
|---|---|---|
| 8,478,801 B2 | 7/2013 | Hutchins et al. |
| 8,893,050 B2 | 11/2014 | Bogner et al. |
| 9,135,031 B1 | 9/2015 | Knight |
| 9,135,033 B1 | 9/2015 | Lee |
| 9,229,850 B1 | 1/2016 | Wang |
| 9,239,860 B1 | 1/2016 | Love |
| 9,244,969 B1 | 1/2016 | Love |
| 9,417,757 B1 | 8/2016 | Caiani et al. |
| 2008/0098309 A1 | 4/2008 | Fries |
| 2008/0155169 A1 | 6/2008 | Hiltgen |
| 2008/0201711 A1 | 8/2008 | Husain |
| 2009/0240904 A1 | 9/2009 | Austruy et al. |
| 2009/0241110 A1 | 9/2009 | Heo |
| 2010/0011178 A1 | 1/2010 | Feathergill |
| 2010/0122248 A1 | 5/2010 | Robinson |
| 2010/0223309 A1 | 9/2010 | Benari |
| 2010/0299368 A1 | 11/2010 | Hutchins et al. |
| 2011/0029972 A1 | 2/2011 | Wade |
| 2011/0184993 A1 | 7/2011 | Chawla |
| 2011/0185355 A1 | 7/2011 | Chawla |
| 2011/0246984 A1 | 10/2011 | Sharp et al. |

\* cited by examiner

PRESENTING A FILE SYSTEM FOR A FILE CONTAINING ITEMS

RELATED APPLICATIONS

This patent application is a continuation of U.S. patent application Ser. No. 13/925,455, entitled "Presenting A File System For A File Containing Items," filed on Jun. 24, 2013, which is a continuation of U.S. patent application Ser. No. 12/874,752, entitled "Presenting A File System For A File Containing Items," filed on Sep. 2, 2010, which is a continuation-in-part of U.S. patent application Ser. No. 12/849,006, entitled "Systems And Methods For Providing A File System View Of A Storage Environment," filed on Aug. 2, 2010, and claims priority to U.S. Provisional Patent Application No. 61/239,674, entitled "Agentless Data Recovery," filed on Sep. 3, 2009, which are hereby incorporated by reference in their entirety.

TECHNICAL FIELD

Aspects of the disclosure are related to the field of computer systems and storage systems, and in particular, providing file systems for accessing data in computer systems.

TECHNICAL BACKGROUND

Traditional backup and archival software transforms source data into a non-filesystem format data that is suitable for long term storage. There are a number of reasons for this, including backup storage media is often sequential in nature and therefore can't easily support the random access requirements of most source data formats, large numbers of source files can be condensed into a single file that is easier to manage, and backup sets often span across multiple removable media tapes or cartridges. With the advent of disk based backups these requirements have become less important, yet these long term storage formats persist. Typically, recovery of files in the non-filesystem format requires the use of a proprietary recovery client.

In the field of computer hardware and software technology, a virtual machine is a software implementation of a machine, such as a computer, that executes program instructions like a real machine. Virtual machine technology allows for sharing, between multiple virtual machines, the physical resources underlying the virtual machines. Typically, in virtual machine environments, an individual agent is required for each virtual machine. The agent provides a data utility with access to the contents of the virtual machine. However, because there are a number of virtual machine vendors, each agent typically comprises proprietary software module and proprietary software tools. Moreover, the shear number of agents can be burdensome to system operators.

OVERVIEW

What is disclosed is a method of operating a volume access system. The method includes processing at least a first file to generate a file system view of the first file comprising a plurality of items within the first file, and providing the file system view of the first file over a network interface as a hierarchical data volume. The method also includes receiving an access request for a requested item of the hierarchical data volume over the network interface, and in response, providing access to a first item of the plurality of items within the first file corresponding to the requested item.

What is also disclosed is a volume access system. The volume access system includes a volume processing system configured to process at least a first file to generate a file system view of the first file comprising a plurality of items within the first file. The volume access system also includes a network interface configured to provide the file system view of the first file as a hierarchical data volume. The network interface is configured to receive an access request for a requested item of the hierarchical data volume, and in response, the volume processing system is configured to provide access to a first item of the plurality of items within the first file corresponding to the requested item.

What is also disclosed is a method of operating a volume access system. The method includes processing at least a condensed backup file to generate a file system view of the condensed backup file comprising a plurality of items within the condensed backup file, and providing the file system view of the condensed backup file over a network interface as a hierarchical data volume for a client device. The method also includes receiving over the network interface a file operation command generated on the client device for a target item of the hierarchical data volume. In response to the file operation command, the method includes performing the file operation command on a first item of the plurality of items within the condensed backup file corresponding to the target item.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
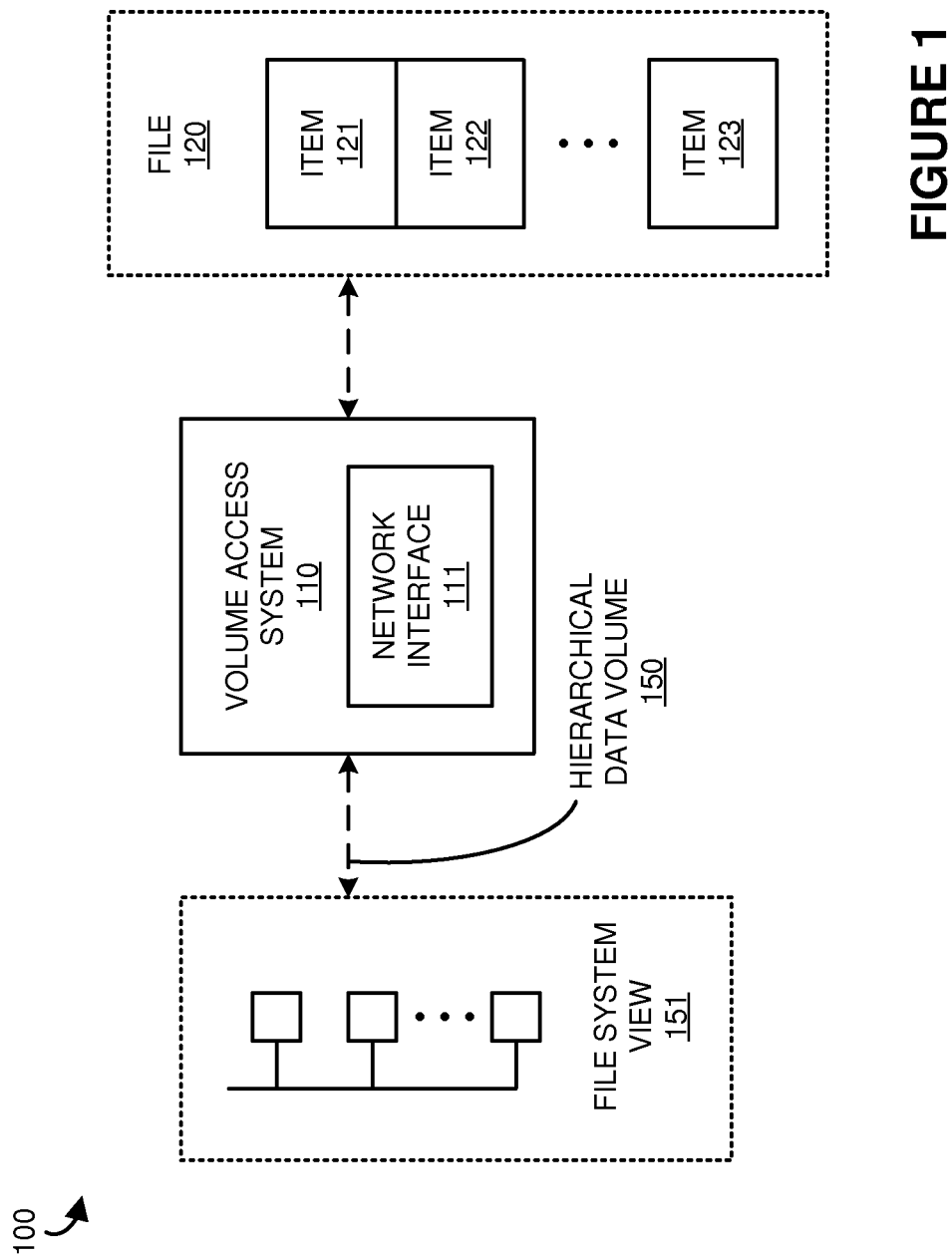
FIG. 1 is a system diagram illustrating a data system.

FIG. 1 is a system diagram illustrating data system 100. Data system 100 includes volume access system 110, file 120, and hierarchical data volume 150. Volume access system 110 includes network interface 111, although other configurations could be employed. Volume access system 110 provides access to data for users, client devices, computer systems, or other data handling systems over network interface 111. In FIG. 1, volume access system 110 can access file 120. File 120 includes a plurality of items, as indicated by items 121-123 in FIG. 1. It should be understood that a different number of items could be included in file 120. In some examples, file 120 is stored on a computer-readable medium and accessible over a data transport link by volume access system 110, as indicated by the arrowed line in FIG. 1.

Figure 2:
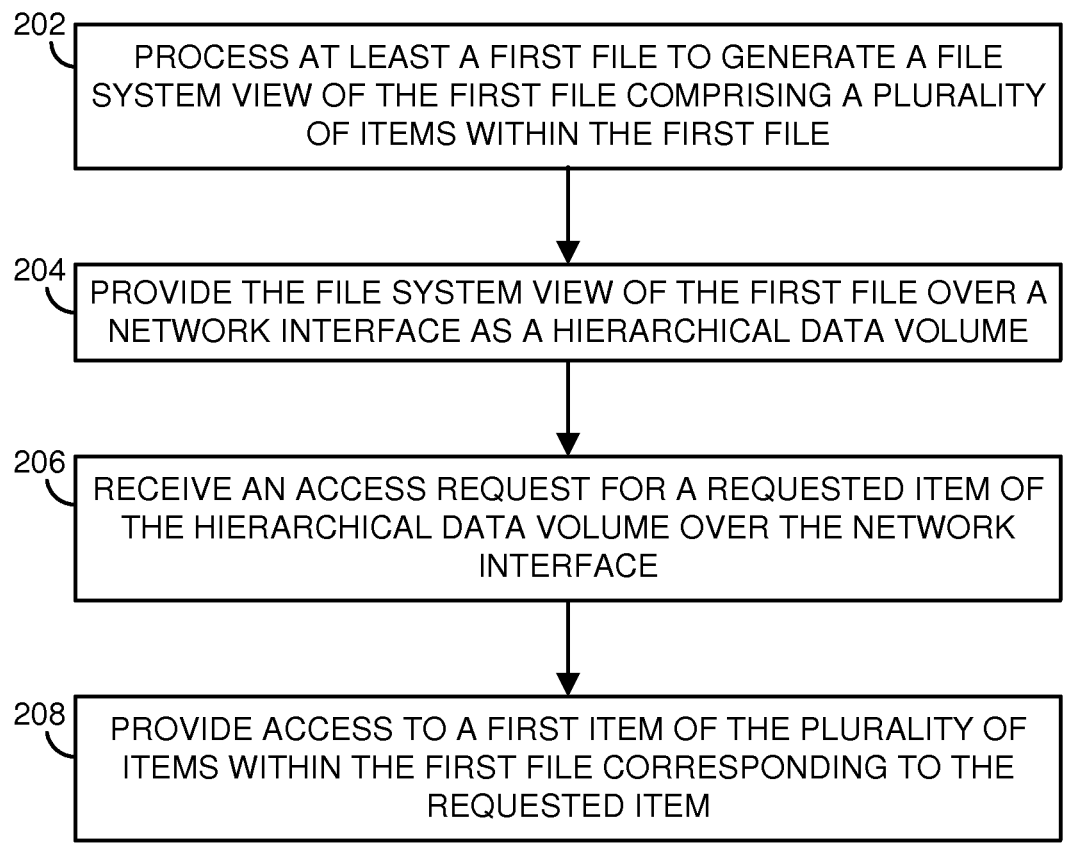
FIG. 2 is a flow diagram illustrating a method of operation of a volume access system.

FIG. 2 is a flow diagram illustrating a method of operation for data system 100. The operations of FIG. 2 are referenced herein parenthetically. In FIG. 2, volume access system 110 processes (202) at least file 120 to generate file system view 151 of file 120 comprising a plurality of items 121-123 within file 120. Volume access system 110 then provides (204) file system view 151 of file 120 over network interface 111 as hierarchical data volume 150. In this example, file 120 could comprise a backup file, condensed backup file, a virtual disk file, virtual machine data, or other data file, and includes items 121-123. Items 121-123 could include further data files, metadata information, file allocation information, or could include virtual processing elements, virtual storage elements, or other data, including combinations thereof. Hierarchical data volume 150 comprises a file system view, such as file system view 151, presented in a hierarchical order. Hierarchical data volume 150 could be provided as a logical data volume, network share, emulated storage device, mountable storage volume, or other data volume over a network link associated with network interface 111, such as to an associated data terminal or client device, or could be provided over user interface systems of volume access system 110, among other configurations.

Volume access system 110 receives (206) an access request for a requested item of hierarchical data volume 150 over network interface 111. In response to the access request, volume access system 110 provides access (208) to a first item of the plurality of items 121-123 within file 120 corresponding to the requested item. The access request could comprise a traversal operation or a metadata operation on hierarchical data volume 150, such as navigating to a folder or directory or accessing item attributes for file system view 151, or could include item access and manipulation operations, such as open, read, write, delete, or modify operations, among other access requests. The access request is received by network interface 111 in this example. Volume access system 110 determines at least a first item correlated to the requested item, and executes the access request for the first item. Providing access to the requested item could include transferring an item corresponding to the requested item over network interface 111, such as during an open or read operation. Providing access to the requested item could include receiving information or data corresponding to the requested item over network interface 111, such as during a write or modify operation.

Figure 3:
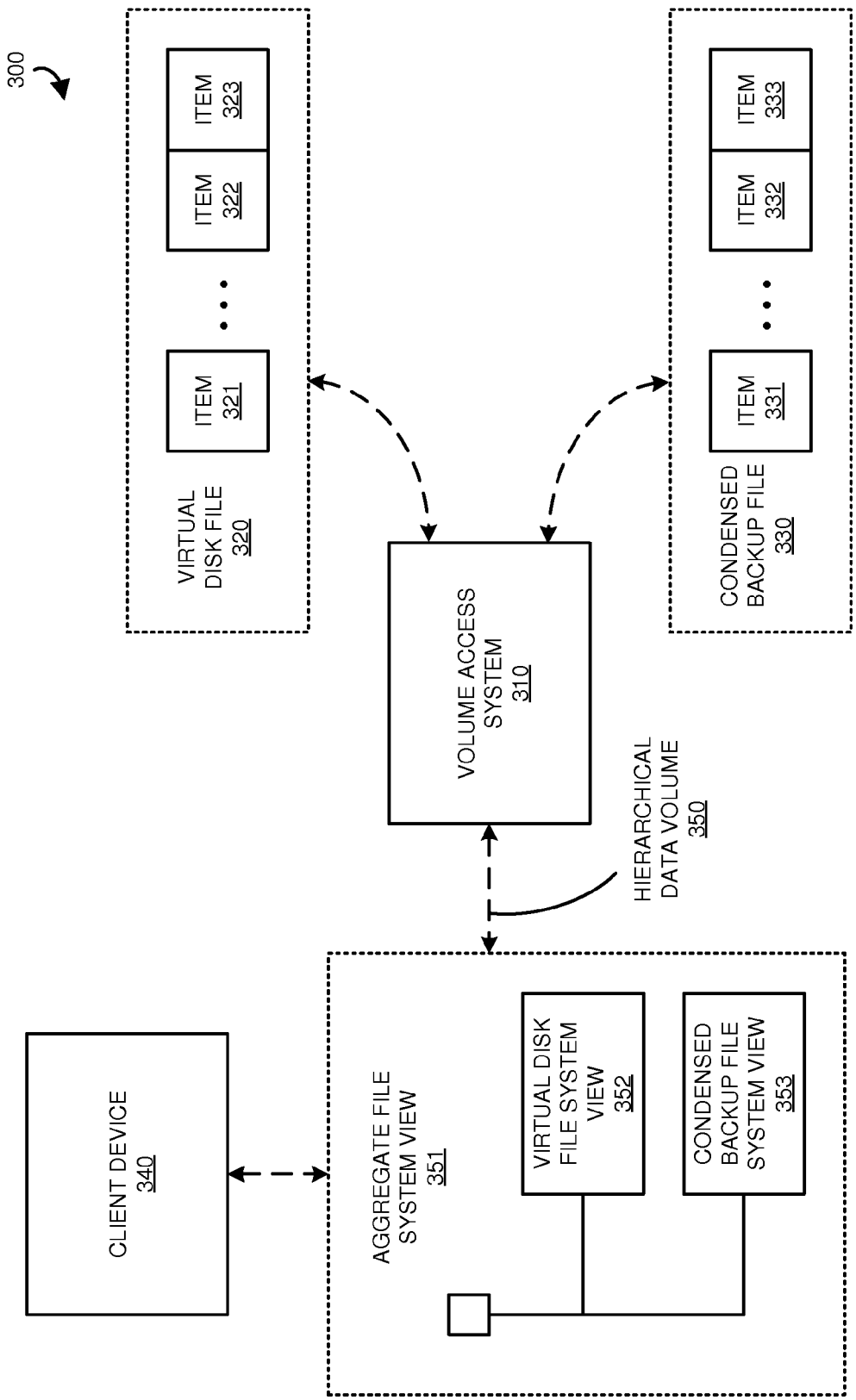
FIG. 3 is a system diagram illustrating a data system.

FIG. 3 is a system diagram illustrating data system 300. Data system 300 includes volume access system 310, virtual disk file 320, condensed backup file 330, client device 340, and hierarchical data volume 350. Volume access system 310 comprises computer systems, such as processing equipment, computer-readable storage media, user interface equipment, and network interfaces. Client device 340 comprises computer systems such as processing equipment, computer-readable storage media, user interface equipment, and network interfaces. Although a network link between volume access system 310 and client device 340 is not shown in FIG. 3 for clarity, it should be understood that a network link, such as described for network link 550 in FIG. 5, could be included between volume access system 310 and client device 340, although other configurations could be employed. A network link could also comprise a local area network, Internet, metropolitan-area network, wireless network, cellular network, among other networks, including combinations thereof. In further examples, a logical or software link could be employed between volume access system 310 and client device 340.

Figure 4:
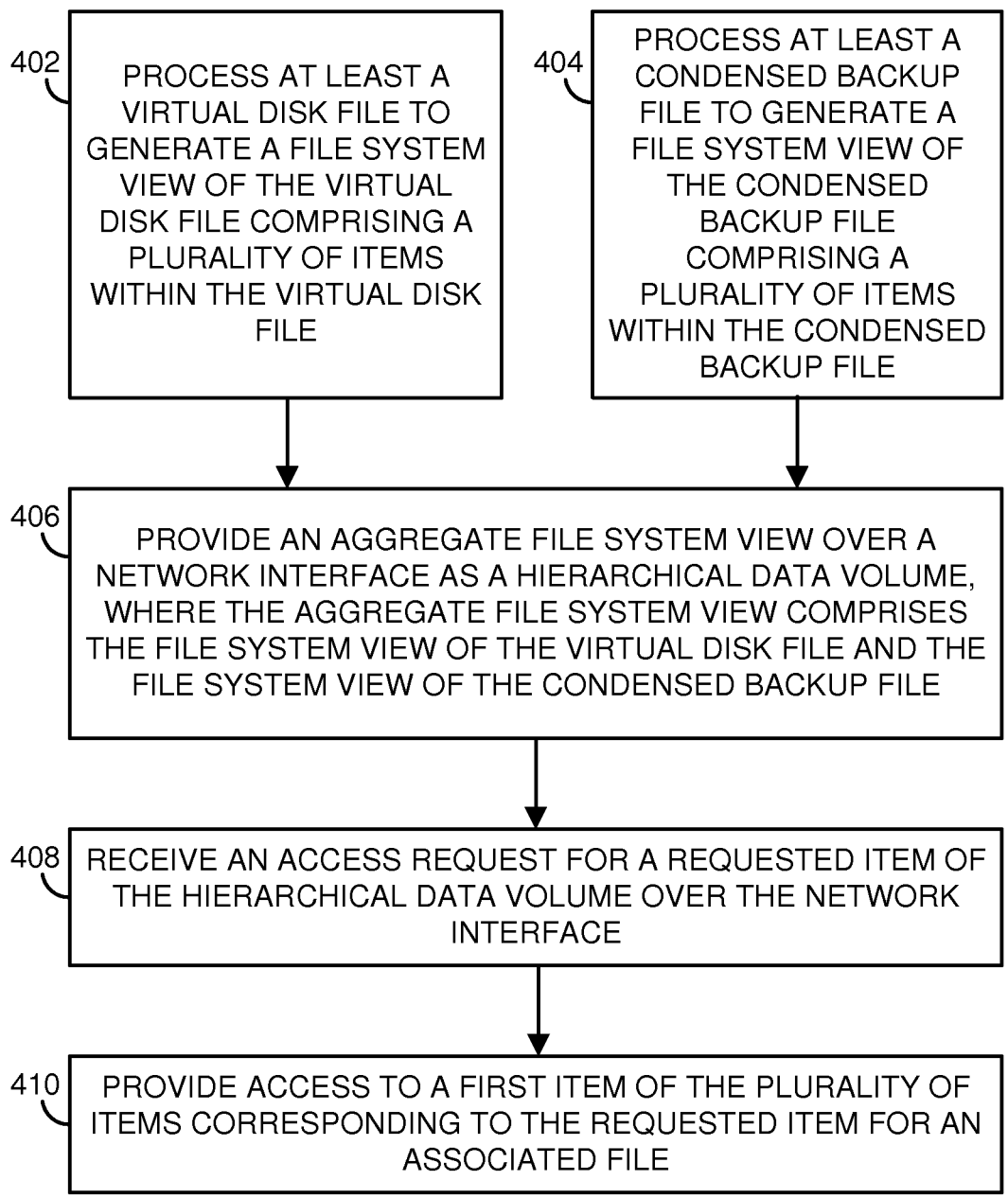
FIG. 4 is a flow diagram illustrating a method of operation of a volume access system.

FIG. 4 is a flow diagram illustrating a method of operation for data system 300. The operations of FIG. 4 are referenced herein parenthetically. In FIG. 4, volume access system 310 processes (402) at least virtual disk file 320 to generate file system view 352 of virtual disk file 320 comprising a plurality of items 321-323 within virtual disk file 320. Volume access system 310 can access virtual disk file 320. Virtual disk file 320 includes a plurality of items, as indicated by items 321-323 in FIG. 3. It should be understood that a different number of items could be included in virtual disk file 320. In some examples, virtual disk file 320 is stored on a computer-readable medium in a computer system and accessible over a data transport link by volume access system 310, as indicated by the arrowed line in FIG. 3. In this example, virtual disk file 320 comprises a virtual disk file associated with a virtual machine. The virtual disk file could be associated with a live or running virtual machine. Items 321-323 could include headers, further data files, subfiles, metadata information, attribute information, file allocation information, logical ordering information such as addresses or maps, or could include virtual processing elements, virtual storage elements, or other data, including combinations thereof.

File system view 352, as generated in operation 402, could include a file system representation of the contents of virtual disk file 320. Virtual disk file 320 includes a plurality of items 321-323 that could be concatenated, condensed, compressed, or otherwise encapsulated within virtual disk file 320. A virtual disk file could comprise a file representation of a virtual machine, and could include a plurality of virtual disk drives, virtual machine metadata, or other virtual machine data. In some examples, one or more virtual disk files are operated on by a hypervisor to instantiate a virtual machine. A containment format or protocol could have been employed to form the encapsulation of the plurality of items 321-323 within virtual disk file 320. File system view 352 could be generated by first interpreting the containment format or protocol to extract information or attributes about the plurality of items 321-323 from virtual disk file 320. Volume access system 310 could then populate file system view 352 by interpreting the names and attributes of the plurality of items 321-323 contained within virtual disk file 320. In some examples, virtual disk file 320 may have a native file system format, while in other examples, virtual disk file 320 may have a non-filesystem format, such as a sequential file format. In examples with a native filesystem format, the native filesystem format could be interpreted to determine file system view 352. In examples with a non-filesystem format, a synthetic file system view could be determined, where a name space of the synthetic file system could be populated by scanning virtual disk file 320 and interpreting the names and attributes for items, such as files or volumes, contained within virtual disk file 320. Volume access system 310 could process a sequential format of virtual disk file 320 to determine a random access format for file system view 352. In other examples, a hierarchical file system view could be determined from the plurality of items 321-323 in virtual disk file 320 to generate file system view 352, although other representations could be employed, such as flat, heap, tree, linked list, or other data structure. In many examples, the data structure of virtual disk file 320 is processed to determine the plurality of items 321-323 as well as to populate a different data structure of file system view 352. In further examples, each of the plurality of items 321-323 could be sorted or arranged in file system view 352 according to different item types.

Volume access system 310 processes (404) at least condensed backup file 330 to generate file system view 353 of condensed backup file 330 comprising a plurality of items 331-333 within condensed backup file 330. Volume access system 310 can access condensed backup file 330. Condensed backup file 330 includes a plurality of items, as indicated by items 331-333 in FIG. 3. It should be understood that a different number of items could be included in condensed backup file 330. In some examples, condensed backup file 330 is stored on a computer-readable medium in a computer system and accessible over a data transport link by volume access system 310, as indicated by the arrowed line in FIG. 3. In this example, condensed backup file 330 comprises a condensed data file containing backup data, which could comprise backup instances of virtual disk files. Items 331-333 could also include headers, further data files, subfiles, metadata information, attribute information, file allocation information, logical ordering information, such as addresses or maps, or could include virtual processing elements, virtual storage elements, or other data, including combinations thereof.

File system view 353, as generated in operation 404, could include a file system representation of the contents of condensed backup file 330. Condensed backup file 330 includes a plurality of items 331-333 that could be concatenated, compressed, or otherwise encapsulated within condensed backup file 330. A containment format or protocol could have been employed to form the encapsulation of the plurality of items 331-333 within condensed backup file 330. File system view 353 could be generated by first interpreting the containment format or protocol to extract information or attributes about the plurality of items 331-333 from condensed backup file 330. Volume access system 310 could then populate file system view 353 by interpreting the names and attributes of the plurality of items 331-333 contained within condensed backup file 330. In some examples, condensed backup file 330 may have a native file system format, while in other examples, condensed backup file 330 may have a non-filesystem format, such as a sequential file format. In examples with a native filesystem format, the native filesystem format could be interpreted to determine file system view 353. In examples with a non-filesystem format, a synthetic file system view could be determined, where a name space of the synthetic file system could be populated by scanning condensed backup file 330 and interpreting the names and attributes for items, such as files or volumes, contained within condensed backup file 330. Volume access system 310 could process a sequential format of condensed backup file 330 to determine a random access format for file system view 353. In other examples, a hierarchical file system view could be determined from the plurality of items 331-333 in condensed backup file 330 to generate file system view 353, although other representations could be employed, such as discussed herein for file system view 352, among other representations. In many examples, the data structure of condensed backup file 330 is processed to determine the plurality of items 331-333 as well as to populate a different data structure of file system view 353. In further examples, each of the plurality of items 331-333 could be sorted or arranged in file system view 353 according to different item types.

Volume access system 310 provides (406) aggregate file system view 351 over a network interface as hierarchical data volume 350, where aggregate file system view 351 comprises virtual disk file system view 352 and condensed backup file system view 353. In this example, hierarchical data volume 350 is provided for client device 340. Aggregate file system view 351 includes a file system representation of both virtual disk file system view 352 and condensed backup file system view 353. To create aggregate file system view 351, volume access system 310 could form a tree structure, as shown in FIG. 3, with virtual disk file system 352 and condensed backup file system view 353 each as branches of the tree. In other examples, a root structure is established, with virtual disk file system 352 and condensed backup file system view 353 established as folders, directories, or parsable files from the root structure. Hierarchical data volume 350 comprises a file system view, such as aggregate file system view 351, presented in a hierarchical structure. Hierarchical data volume 350 could be provided as a logical data volume, network share, emulated storage device, mountable storage volume, server message block (SMB) share resource, Samba share resource, network file share resource, hierarchical object in a directory database, or other data volume over a network link associated with volume access system 310 and client device 340.

Once hierarchical data volume 350 is provided for client device 340, operating system operations can be performed by client device 340 on items represented in hierarchical data volume 350. This could include where providing aggregated file system view 351 as hierarchical data volume 350 comprises servicing metadata and traversal operations for the plurality of items 321-323 for virtual disk file 320 or for the plurality of items 331-333 of condensed backup file 330 by client device 340 using native operating system operations on hierarchical data volume 350. Additional operations could be performed on items represented in hierarchical data volume 350.

Volume access system 310 receives (408) an access request for a requested item of hierarchical data volume 350 over the network interface. Access requests are typically generated in response to operating system operations directed towards hierarchical data volume 350 on client device 340 for the requested item. These operations could include item open, read, write, delete, create, or modify operations, among other operations, and could include native operating system versions of the operations executed on an operating system of client device 340. The access request could comprise additional traversal operations on hierarchical data volume 350, as discussed above, such as changing current working directories or folders. The native operating system commands could include a chdir command to change directories, or a getattr command to get attributes for items, among other operations. The access request could comprise metadata access operations, such as reading, writing, and modifying item metadata or attributes for items presented in hierarchical data volume 350, which could include metadata manipulation operations such as item renaming, permission modification, timestamp modification, among other operations. The access request could comprise item movement operations for moving items within hierarchical data volume 350, or the associated file system views. The access request is transferred for delivery to volume access system 310 by client device 340 in this example, and could be transferred for delivery over a network or other link as discussed herein. In some examples, the requested item is referred to as a target item.

In response to the access request, volume access system 310 provides access (410) to a first item of the plurality of items corresponding to the requested item for an associated file. The associated file could be either virtual disk file 320 or condensed backup file 330 in this example, where volume access system 310 provides access to at least an item of the plurality of items for the associated file 320 or 330 corresponding to the requested item. To provide the access to the first item, volume access system 310 determines at least a first item correlated to the requested item, and processes the access request for the first item. Providing access to the requested item could include transferring an item or items corresponding to the requested item for delivery to client device 340, such as during an open or read operation. Providing access to the requested item could include receiving instructions or data corresponding to the requested item for delivery to volume access system 310 from client device 340, such as during a write, delete, move, or modify operation. In typical examples, the access requests are responsively processed by volume access system 310 while virtual disk file 320 and condensed backup file 330 remain in their original form, such as a virtual disk file or condensed backup file.

In some examples, the requested item comprises a requested data file, and the operating system operation which generates the access request comprises either a file open operation or a file read operation. The file open or read operation could be interpreted by volume access system 310 to access an item or items contained within virtual disk file 320 or condensed backup file 330. Providing access to the requested item, such as an item or data file within the file corresponding to the requested item, could comprise processing the corresponding file to identify internal blocks of the corresponding file associated with the requested item, and transferring the blocks associated with the requested item for delivery to client device 340 as an item or data file of hierarchical data volume 350. In some examples, volume access system 310 could cache or buffer the blocks once identified.

In one example, if the requested item is an open operation for a data file associated with condensed backup file system view 353, then volume access system 310 would identify the internal blocks of condensed backup file 330 corresponding to the requested item within condensed backup file 330, such as the blocks corresponding to item 332, and transfer the blocks, or merely a status indicator of the open file status, of the requested item for delivery to client device 340.

In another example, if the requested item is a read request operation for a data file or item associated with virtual disk file 320, then volume access system 310 would identify the internal blocks of virtual disk file 320, such as the blocks corresponding to item 321, and transfer the blocks of the requested item for delivery to client device 340. In some virtual machine systems, reading a virtual disk file comprises booting a virtual machine that comprises the virtual disk file or an item in the virtual disk file. Thus, reading an item of virtual disk file 320 could comprise booting a virtual machine corresponding to the requested item, such as booting a backup version of a virtual machine on client device 340 through a read access request for an item of file system view 352 presented in hierarchical data volume 350.

In yet another example, the items of virtual disk file 320 or condensed backup file 330 comprise full data sets as well as incremental data sets, such as differential data sets. Aggregate file system view 351, provided as hierarchical data volume 350, could comprise a file system view, or blocks of the associated items, of full data sets and incremental data sets chained together to provide a single point in time view. The single point in time view could include presenting items in hierarchical data volume 350 from many data sets backed up at different times. Volume access system 310 could interpret the many data sets and associated backup time information to present a chained file system view for client device 340, where full data sets are presented as modified by later incremental data sets, for example. Other full and incremental data set representations could be employed.

Although in the examples shown in FIGS. 1-4, a single file is processed to determine a file system view, such as files 120, 320, or 330, it should be understood that in other examples multiple files could comprise a single storage file, such as when multiple files span multiple storage devices or computer-readable storage media, which can be concatenated to form the single storage file. Additionally, helper files or information, such as attribute files, registry information, configuration files, or other additional information apart from the storage file itself may be processed along with the storage file to determine a file system view. In some examples of hierarchical data volume 150 or 350, multiple hierarchical data volumes are provided, such as when many source files, such as virtual disk files or condensed backup files, are presented as separate file system views.

Figure 5:
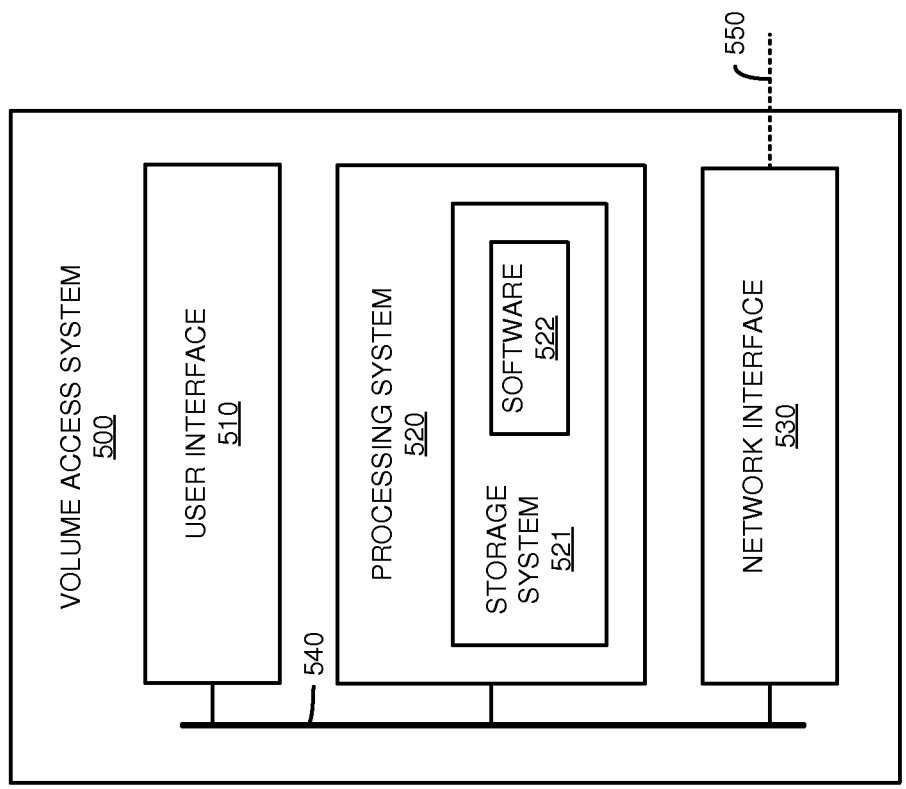
FIG. 5 is a block diagram illustrating a volume access system.

FIG. 5 is a block diagram illustrating volume access system 500, as an example of volume access system 110 found in FIG. 1 or volume access system 310 found in FIG. 3, although volume access system 110 or volume access system 310 could use other configurations. Volume access system 500 includes user interface 510, processing system 520, and network interface 530. User interface 510, processing system 520, and network interface 530 communicate over bus 540. Volume access system 500 may be distributed among multiple devices that together form elements 510, 520-522, 530, 540, and 550.

User interface 510 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 510 also includes equipment to communicate information to a user of volume access system 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 520 includes storage system 521. Processing system 520 retrieves and executes software 522 from storage system 521. In some examples, processing system 520 is located within the same equipment in which user interface 510 or network interface 530 are located. In further examples, processing system 520 comprises specialized circuitry, and software 522 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as process files to generate file system views, provide the file system views to network interface 530 as hierarchical data volumes, receive and process access requests for items of the hierarchical data volumes, or determine items or files within a file, among other operations.

Network interface 530 comprises a network interface card, network transceiver and communication circuitry, wireline, optical, or wireless interfaces, or other communication equipment for communicating over network links of a data system, such as providing file system views to client devices, receiving access requests, providing access to items of files, and accessing files containing items, among other operations. Network interface 530 exchanges user communications and data communications with external systems, such as client devices or data terminals, over network link 550.

Network link 550 uses metal, glass, optical, air, space, or some other material as the transport medium. Network link 550 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Network link 550 could be a direct link or may include intermediate networks, systems, or devices. Network link 550 may include many different signals sharing the same link—as represented by the associated line in FIG. 5—comprising access channels, notification channels, forward links, reverse links, user communications, communication sessions, overhead communications, frequencies, other channels, carriers, timeslots, transportation ports, logical transportation links, network sockets, packets, volumes, or communication directions.

Bus 540 comprises a physical, logical, or virtual communication link, capable of communicating data, control signals, and communications, along with other information. In some examples, bus 540 is encapsulated within the elements of user interface 510, processing system 520, or network interface 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Referring back to FIG. 1, volume access system 110 comprises network interface 111 as well as processing systems to process files to generate file system views of the files comprising a plurality of items within the files, provide file system views over network interface 111 as hierarchical data volumes, receive access requests for requested items of the hierarchical data volumes over network interface 111, and provide access to items of the plurality of items within the files corresponding to the requested items, among other operations. Volume access system 110 includes communication interfaces, as well as computer systems, microprocessors, circuitry, or some other processing devices or software systems, and may be distributed among multiple processing devices. Examples of volume access system 110 may also include software such as an operating system, logs, databases, utilities, drivers, networking software, and other software stored on a computer-readable medium. Volume access system 110 could also include application servers, application service provider systems, database systems, web servers, streaming media servers, authentication systems, or other systems.

File 120 comprises a computer-readable file stored on a computer-readable medium. File 120 could be included in the equipment or systems of volume access system 110 or could be included in separate equipment or systems. In examples of separate equipment or systems, file 120 could be stored in equipment or systems that comprise communication interfaces, network interfaces, computer systems, microprocessors, circuitry, computer readable media, or other processing devices or software systems, and may be distributed among multiple processing devices and software systems.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a volume access system, the method comprising:
   processing at least a virtual disk file associated with a virtual machine to generate a file system view of the virtual disk file comprising a plurality of items within the virtual disk file;
   processing at least a condensed backup file to generate a file system view of the condensed backup file comprising a plurality of items within the condensed backup file;
   providing the file system view of the condensed backup file over a network interface as a hierarchical data volume for a client device;
   receiving over the network interface a file operation command generated on the client device for a target item of the hierarchical data volume; and
   in response to the file operation command, performing the file operation command on a first item of the plurality of items within the condensed backup file corresponding to the target item, and the file system view of the virtual disk file.

2. The method of claim 1, further comprising: providing an aggregate file system view over the network interface as the system view of the condensed backup file.

3. A volume access system, comprising:
   a volume processing: system configured to process at least a virtual disk file associated with a virtual machine to generate a file system view of the virtual disk file comprising a plurality of items within the virtual disk file and a condensed backup file to generate a file system view of the condensed backup file comprising a plurality of items within the condensed backup file;
   a network interface configured to provide the file system view of the condensed backup file as a hierarchical data volume for a client device and receive a file operation command generated on the client device for a target item of the hierarchical data volume; and
   the volume processing system configured to perform the file operation command on a first item of the plurality of items within the condensed backup file corresponding to the target item in response to the file operation command, and the file system view of the virtual disk file.

4. The volume access system of claim 3, further comprising: the network interface configured to provide an aggregate file system view as the hierarchical data volume, wherein the aggregate file system view comprises the file system view of the condensed backup file.

5. A non-transitory computer readable medium having instructions stored thereon for operating a volume access system, the instructions, when executed by the volume access system, direct the volume access system to:
- process at least a virtual disk file associated with a virtual machine to generate a file system view of the virtual disk file comprising a plurality of items within the virtual disk file;
- process at least a condensed backup file to generate a file system view of the condensed backup file comprising a plurality of items within the condensed backup the;
- provide the system view of the condensed backup file over a network interface as a hierarchical data volume for a client device;
- receive over the network interface a file operation command generated on the client device for a target item of the hierarchical data volume; and
- in response to the file operation command, perform the file operation command on a first item of the plurality of item within the condensed backup file corresponding to the target item, and the file system view of the virtual disk the.

6. The non-transitory computer readable medium of claim 5, wherein the instructions direct the volume access system to; provide an aggregate file system view over the network interface as the system view of the condensed backup file.

* * * * *